United States Patent [19]

Akesson et al.

[11] Patent Number: 4,461,781

[45] Date of Patent: Jul. 24, 1984

[54] FREEZING OF VEGETABLES

[75] Inventors: Yngve R. Akesson, Halsingborg; Bengt L. Bengtsson, Bjuv; Lars G. Bodenaes, Aengelholm, all of Sweden

[73] Assignee: Societe d'Assistance Technique pour Produits Nestle, S.A., Lausanne, Switzerland

[21] Appl. No.: 491,283

[22] Filed: May 3, 1983

[30] Foreign Application Priority Data

May 3, 1982 [EP] European Pat. Off. ............ 82103771

[51] Int. Cl.³ ............................................... A23B 7/04
[52] U.S. Cl. ................................. 426/524; 426/388; 426/519; 62/57; 62/65
[58] Field of Search .............. 426/524, 388, 618, 444, 426/519; 62/57, 65

[56] References Cited

U.S. PATENT DOCUMENTS

| | | | |
|---|---|---|---|
| 2,385,140 | 9/1945 | Knowles | 426/524 |
| 3,030,214 | 4/1962 | Miller | 426/524 |
| 3,377,172 | 4/1968 | Benson et al. | 426/524 |
| 3,453,121 | 7/1969 | Webster et al. | 426/524 |
| 3,734,751 | 5/1973 | Bengtsson et al. | 426/388 |
| 3,865,965 | 2/1975 | Davis et al. | 426/524 |
| 4,042,717 | 8/1977 | Gayte | 426/524 |
| 4,086,369 | 4/1978 | Mutoh et al. | 426/524 |
| 4,230,732 | 10/1980 | Paradice et al. | 426/524 |
| 4,308,295 | 12/1981 | Kuntz et al. | 426/524 |
| 4,335,584 | 6/1982 | Lermuzeaux | 426/524 |

FOREIGN PATENT DOCUMENTS

| | | | |
|---|---|---|---|
| 1043160 | 11/1978 | Canada | 426/524 |
| 55-7221 | 2/1980 | Japan | 426/524 |
| 1552348 | 9/1979 | United Kingdom | 426/524 |
| 2039015 | 7/1980 | United Kingdom | 426/524 |

OTHER PUBLICATIONS

Methods of Quick Freezing, Refrigerating Engineering, 2/41.

Primary Examiner—Steven L. Weinstein
Attorney, Agent, or Firm—Vogt & O'Donnell

[57] ABSTRACT

A method of freezing boiled rice or a blanched leafy vegetable in a freezer having an operating temperature from −25° C. to −50° C. characterized in that before entering the freezer, the unfrozen product is cooled and intimately mixed with from 20% to 80% by weight based on the weight of the mixture of already frozen free-flowing boiled rice or blanched leafy vegetable.

5 Claims, No Drawings

FREEZING OF VEGETABLES

The present invention relates to a method for the freezing of food particles, especially boiled rice and blanched leafy vegetables.

It is well-known to freeze a broad range of vegetables in freezers having operating temperatures from −25° C. to −50° C., for instance, band freezers, batch-freezers and fluidised bed freezers. The main advantages of such freezers are that the freezing time is very short and that the final product is free flowing.

Some food particles are, however, quite difficult to handle in such freezers. One reason is that the particles are very sticky. Another reason is that the particles absorb a good deal of water which results in poor fluidisation and a lot of frozen lumps. Although small lumps of less than 20 mm diameter are acceptable in most cases, large lumps are either wasted or they have to be thawed and refrozen which increases the processing costs. Typical examples of food products which are difficult or impossible to freeze in such freezers are boiled rice and blanched leafy vegetables such as onions, leek, parsley and spinach. At the present time such food products are preferably frozen in liquid freezants such as freon or nitrogen. However, liquid freezants are expensive and there are unavoidable losses to the atmosphere. In the case of freon, the risks of atmospheric pollution have been the subject of much discussion and there is a strong desire among food processors to avoid the use of freon as a liquid freezant.

We have now found, surprisingly, that boiled rice or blanched leafy vegetables can be frozen in such freezers to give a substantially non-lumpy free-flowing product if a certain amount of already frozen free-flowing product is intimately mixed with the unfrozen product before entering the freezer.

Accordingly, the present invention provides a method of freezing boiled rice or a blanched leafy vegetable in a freezer having an operating temperature from −25° C. to −50° C. characterised in that before entering the freezer the unfrozen product is cooled and intimately mixed with from 20% to 80% by weight based on the weight of the mixture of already frozen free-flowing boiled rice or blanched leafy vegetable.

The freezer may be a band freezer or a batch freezer but the method of this invention is most advantageously carried out in a fluidised bed freezer. Before being mixed with the already frozen product, the unfrozen product is preferably cooled in water or air to a temperature from 5° C. to 25° C. and especially from 7.5° C. to 20° C., and then it may advantageously be dewatered, for instance by mild pressing or in a vibrating dewatering screen. By "dewatered" we do not mean the removal of the natural cell-moisture content of the product as by heat-drying techniques. Preferably, the unfrozen blanched leafy vegetable is in the form of small pieces obtained, for instance, by dicing.

Preferably, the amount of already frozen product mixed with the unfrozen product is from 30% to 70% by weight and especially from 40% to 60% by weight based on the weight of the mixture. The mixing is advantageously carried out immediately before entry to the freezer. There are a variety of ways in which the frozen product may be mixed with the unfrozen product. For example, the mixing may be carried out in a mechanical mixing screw. Alternatively, it is possible to use air transport in a tube where the frozen and unfrozen products are fed by screws into the tube and the mixing is achieved during a few seconds transport in air. The temperature of the mixture as it enters the freezer is preferably from −5° C. to +2° C. and preferably from −3° C. to +1° C.

The temperature in the freezer during operation is conveniently from −30° C. to −45° C. and preferably from −32.5° C. to −42.5° C. The duration of the freezing may be from 2 to 10 minutes, preferably from 3 to 7 minutes and especially from 4 to 6 minutes.

After freezing, the temperature of the frozen product is generally from −20° C. to −35° C. and preferably from −25° C. to −30° C. A certain quantity of the frozen product is recirculated to be mixed with fresh unfrozen product and the remainder is collected.

In addition to providing a free-flowing product substantially free of lumps, another advantage of the method of this invention is the lower temperature of the product entering the freezer. Most products enter a fluidised bed freezer after having been cooled by air or water to a temperature of from 5° C. to 25° C. whereas in the method of the present invention the mixture of frozen and unfrozen product enters the freezer at a temperature around 0° C. or just below. A product frozen in a fluidised bed always loses some water by evaporation and this water condenses in the cooling battery which has to be defrosted regularly, resulting in a loss of freezing capacity and energy. The water evaporation is reduced by the method of the present invention and therefore, there is not only less condensation in the cooling battery but also an increased product yield.

The following Examples further illustrate the present invention.

EXAMPLE 1

Long grain rice was fed by a screw and pumped into an inclined thermoscrew which was partially filled with water. The rice was blanched in water for 8 minutes and then in steam for 2 minutes. The blanched rice was pumped in cold water until the temperature fell to 15° C. and then pumped to a vibrating screen for dewatering. From the screen the rice fell into a mixing screw. Frozen product was transported by another screw from the outfeed end of a fluidised bed freezer to the mixing screw where it was mixed with the unfrozen rice in a 50:50 ratio for 1 minute. The mixing screw was used to feed the mixture directly into the infeed end of the fluidised bed freezer in which the mixture was frozen for 5 minutes at a temperature from −35° C. to −40° C.

At the start of the process, a certain quantity of prefrozen free-flowing rice was mixed with unfrozen rice to fill up the fluidised bed freezer. After freezing, some of the rice was collected in sacks and the remainder was recirculated via a screw to be mixed with fresh unfrozen product. The temperature of the frozen rice was −28° C.

After 8 hours, 600 kg of frozen rice were obtained and the rice was screened to measure the amount of lumps. The screen was designed to separate lumps having a diameter of 20 mm or more and no such lumps were present in the frozen sample.

EXAMPLE 2

A similar procedure to that described in Example 1 was followed but in which the ratio of unfrozen to frozen rice was 46:54. No lumps having a diameter of 20 mm or more were present in the final frozen sample.

EXAMPLE 3

A similar procedure to that described in Example 1 was followed but in which the ratio of unfrozen to frozen rice was 52:48. No lumps having a diameter of 20 mm or more were present in the final frozen sample.

EXAMPLE 4

A similar procedure to that described in Example 1 was followed but instead of rice, diced onion was used which was blanched in steam for 1 minute in the thermoscrew. Only 1% of lumps having a diameter of 20 mm or more were found to be present in the final frozen sample.

COMPARATIVE EXAMPLE A

A similar procedure to that described in Example 1 was followed but in which no frozen free-flowing rice was added back and mixed with the blanched unfrozen rice. The amount of lumps having a diameter larger than 20 mm was found to be 14% by weight of the total weight produced.

COMPARATIVE EXAMPLE B

A similar procedure to that described in Example 4 was followed but in which no frozen free-flowing onions were added back and mixed with the blanched unfrozen diced onions. The amount of lumps having a diameter larger than 20 mm was found to be 10.1% by weight of the total weight produced.

We claim:

1. A method of freezing boiled rice or a blanched leafy vegetable in a freezer having an operating temperature from −25° C. to −50° C. to produce a frozen substantially non-lumpy, free-flowing product characterised in that before entering the freezer, the unfrozen boiled rice or blanched leafy vegetable is cooled and then intimately mixed with from 20% to 80% by weight based on the weight of the mixture of already frozen free-flowing boiled rice or blanched leafy vegetable, respectively.

2. A method according to claim 1 characterised in that the freezer is a fluidised bed freezer.

3. A method according to claim 1 characterised in that the unfrozen rice or vegetable is dewatered before being mixed with the already frozen rice or vegetable.

4. A method according to claim 1 characterised in that the amount of already frozen rice or vegetable mixed with the unfrozen rice or vegetable is from 40% to 60% by weight based on the weight of the mixture.

5. A method according to claim 1 characterised in that the temperature of the mixture as it enters the fluidised bed freezer is from −3° C. to +1° C.

* * * * *